United States Patent
Marvin

[11] 3,880,504
[45] Apr. 29, 1975

[54] PRESSURE RELIEF MECHANISM

[75] Inventor: Edgar Samuel Marvin, Rochester, N.Y.

[73] Assignee: Eastman Kodak Company, Rochester, N.Y.

[22] Filed: Oct. 3, 1972

[21] Appl. No.: 294,711

[52] U.S. Cl. ............ 352/29; 352/27; 352/30; 352/72; 352/78
[51] Int. Cl. .................. G03b 19/18
[58] Field of Search ........ 352/27, 29, 30, 72, 78; 360/3, 105

[56] References Cited
UNITED STATES PATENTS

| | | | |
|---|---|---|---|
| 3,405,945 | 10/1968 | Braeth | 360/3 |
| 3,514,194 | 5/1970 | Ariyasu et al. | 352/72 |
| 3,609,844 | 10/1971 | Ichikawa | 179/100.2 Z |
| 3,656,761 | 4/1972 | Laschenski | 179/100.2 Z |
| 3,659,859 | 5/1972 | Marcinkus | 179/100.2 Z |
| 3,800,324 | 3/1974 | Nakamicki | 360/105 |
| 3,800,327 | 3/1974 | Okita et al. | 360/105 |

FOREIGN PATENTS OR APPLICATIONS
262,769  6/1968  Austria .................. 352/27

Primary Examiner—Samuel S. Matthews
Assistant Examiner—Russell E. Adams, Jr.
Attorney, Agent, or Firm—J. Morrow

[57] ABSTRACT

A sound motion picture camera which is adapted to receive a film cartridge to record both images and sound onto a film strip carried by the cartridge includes a capstan and a cooperating pressure roller to advance the film continuously past the sound recording head of the camera as an image sequence is being filmed. In the cartridge chamber of the camera the capstan is rotatably positioned along the film path and the pressure roller is rotatably secured to a retractable device which is adapted to be moved between a first position wherein the roller is in resilient contact with the capstan when the trigger mechanism of the camera is depressed and a second position wherein the pressure roller is separated from the capstan when the trigger mechanism is no longer actuated.

11 Claims, 4 Drawing Figures

PRESSURE RELIEF MECHANISM

BACKGROUND OF THE INVENTION

1. Field of the Invention

This invention relates to a mechanism of the type adapted to receive and continuously advance an elongated strip of web material, and more specifically, the invention relates to a capstan and pressure roller drive mechanism adapted to advance a filmstrip past the sound recording apparatus of a sound motion picture camera for permitting continuous recording of sound onto a sound record portion of a filmstrip simultaneously with the exposure of scene images onto the film.

2. Description of the Prior Art

For sound recording apparatus such as found in motion picture camera, it is known to provide a pressure roller or a pinch roller to cooperate with a capstan member for continuously driving the recording member past a sound recording head. It is also known to support the pressure roller such that the roller may be moved a spaced distance from the capstan to permit the sound recording member to be inserted into or removed from a position between the capstan and pressure roller in a motion picture camera. For example, U.S. Pat. No. 3,514,194 discloses a spring pressed roller which is movable into contact with a feed roller in response to the closing of the back cover of the movie camera and is movable from contact with the feed roller when the cover is opened by the operator.

In recording upon a sound recording portion of a film member in a sound motion picture camera, it is desirable to relieve the pressure upon the film member when the camera is to remain inoperative for a period of time in order to prevent the film from taking a set which may be detrimental to the operation of the camera and to avoid the film being damaged by the pressure being exerted upon the film emulsion. In a sound motion picture camera of the type disclosed in the aforementioned U.S. Pat. No. 3,514,194, the operator can open the back of the camera to release the pressure upon the recording member. However, opening of the back of the camera could result in fogging or at least a portion of the film. Alternatively, a separate control mechanism could be provided for moving the roller and the capstan but movement of this control mechanism would require a separate, conscious operation by the operator to position the roller into and out of contact with the capstan. Since it is possible for the operator to overlook positioning of the members, it would possibly result in wasted film or failure to obtain the desired sound recording by not having the capstan drive the film properly. Thus, it is desirable to provide an improved mechanism for automatically moving the pressure roller into contact with the capstan at the same time the capstan drive mechanism is actuated and to move the pressure roller a spaced distance from the capstan when the drive mechanism is no longer actuated.

SUMMARY OF THE INVENTION

Accordingly, it is an object of the present invention to provide a pressure roller mounted for movement to permit a sound recording member to be positioned between the pressure roller and a capstan of the camera and to provide for relieving the pressure between the roller and capstan when the capstan drive mechanism is not actuated.

Another object of the present invention is to provide an improved mechanism for automatically moving the pressure roller between an inoperative position where the roller is spaced from the capstan to an operative position wherein the roller is engaged with the capstan for continuously driving the recording member past the sound recording head of a motion picture camera simultaneously with recording of an image sequence.

It is further an object of the present invention to provide a mechanism for moving a pressure roller into resilient contact with a film to urge the film against a capstan of a sound motion picture camera for driving the film past the sound recording apparatus of the camera only when the trigger for operating the drive mechanism of the camera is actuated.

Still a further object of the present invention is to provide a control device for the sound motion picture camera which is adapted to retract the pressure roller away from the capstan to relieve pressure on a filmstrip each time the film advancing mechanism of the camera is de-activated.

According to a preferred embodiment of the present invention, the drive mechanism for advancing a strip of web material includes a capstan and a pressure roller which are adapted to be urged into resilient contact. The pressure roller is supported by a member which is movable between a (1) first position wherein the roller is in resilient contact with the capstan and (2) a second position wherein the roller is spaced from the capstan such that the web material can be positioned or removed from therebetween and such that pressure exerted upon the web material by the capstan and roller is relieved. Movement of the member for positioning the pressure roller is regulated by a control means which also causes the capstan to be driven when the roller is in contact with the capstan.

BRIEF DESCRIPTION OF THE DRAWINGS

In a detailed description of the preferred embodiment of the invention presented below, reference is made to the accompanying drawings in which.

DESCRIPTION OF THE PREFERRED EMBODIMENT

Because photographic apparatus are well known, the present description will be directed in particular to elements forming part of, or cooperating more directly with, the present invention, apparatus not specifically shown or described herein being understood to be selectable from those known in the art.

Figure 1:
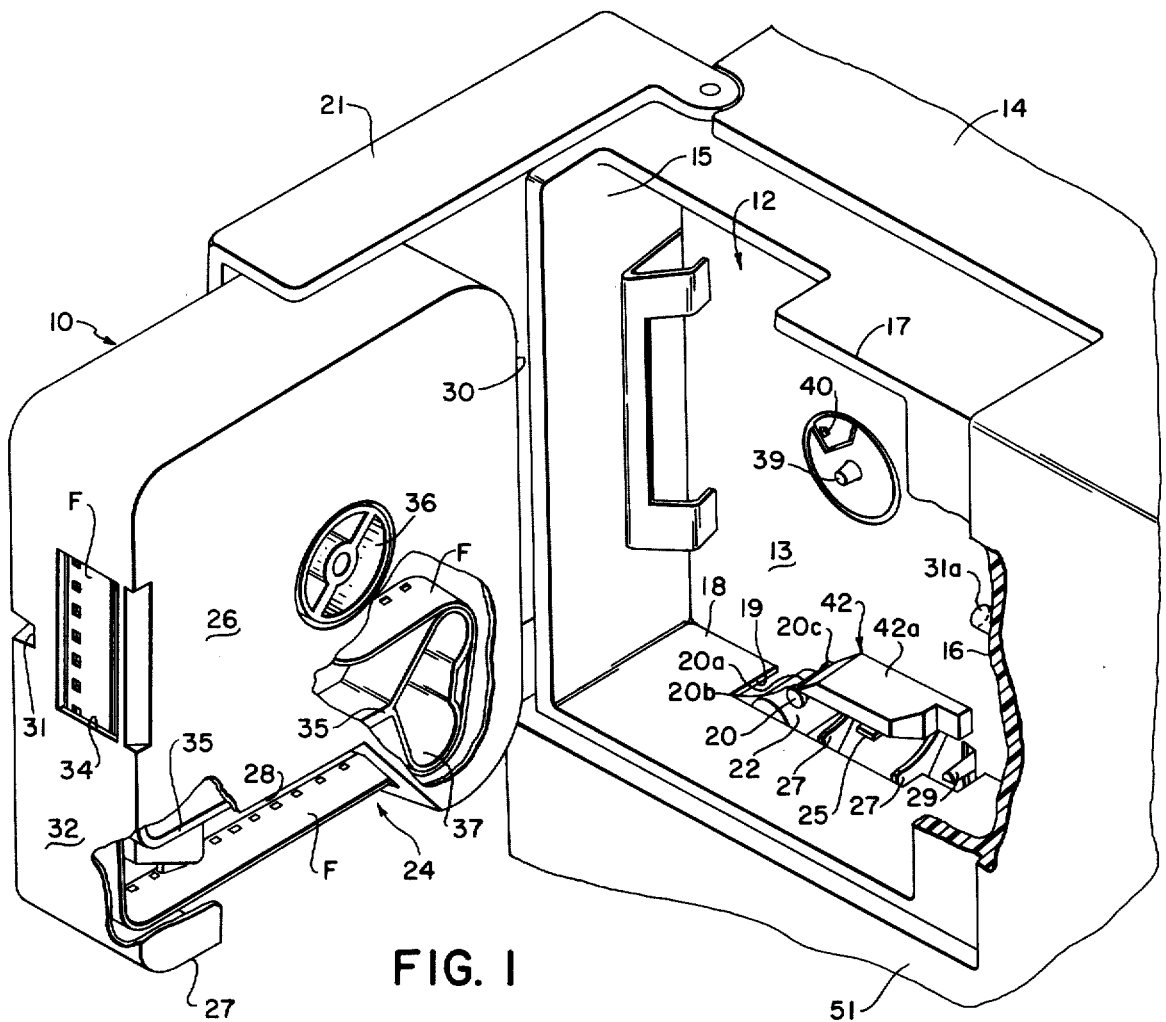
FIG. 1 is a fragmentary perspective view with parts broken away showing a sound motion picture camera incorporating a pressure relief mechanism of the present invention and a sound film cartridge of the type suitable for use with the camera.
Figure 3:
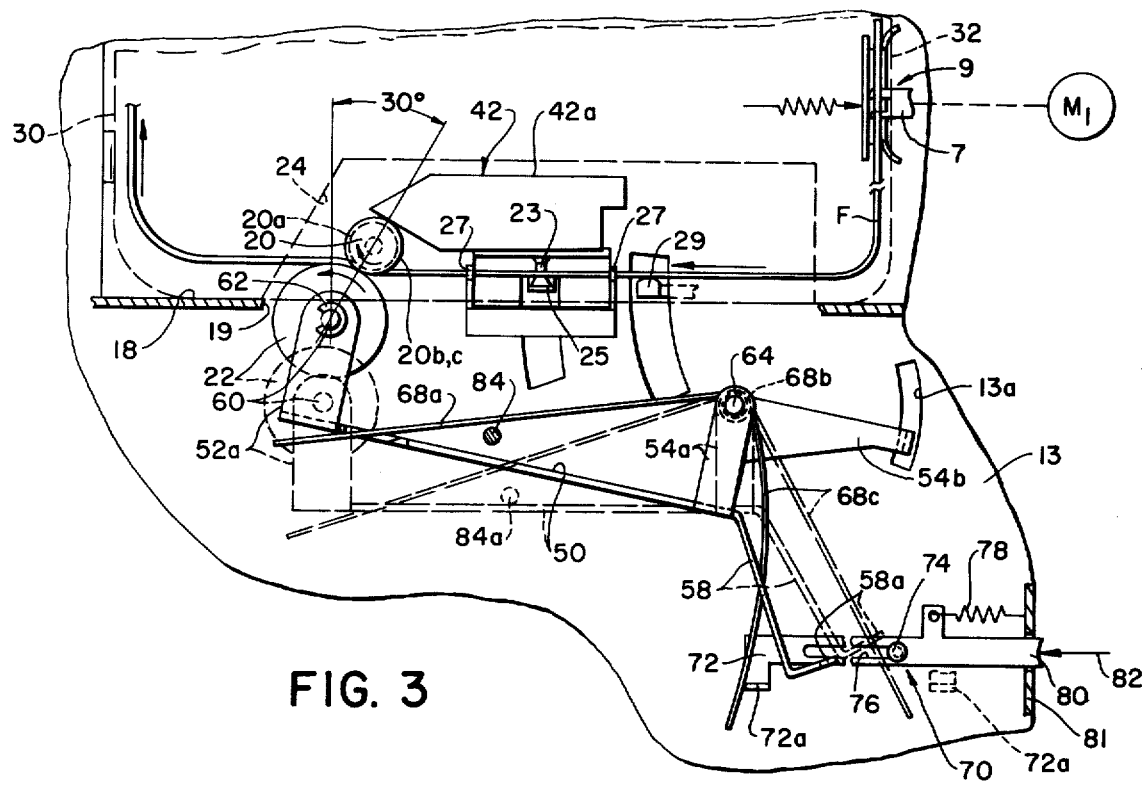
FIG. 3 is a fragmentary cross-sectional view of the pressure relief mechanism of the invention showing in solid lines portions of the sound apparatus of the motion picture camera and the sound cartridge as they cooperate with the invention when the mechanism is in operation and showing in phantom the various parts in their respective positions when the pressure roller is retracted to allow insertion or removal of the film and cartridge.

Referring now to the drawings, the numeral 10 generally designates a film cartridge of the type disclosed in more detail in commonly-assigned copending U.S. Pat. application Ser. No. 256,552 entitled, "FILM CARTRIDGE WITH GUIDE FINGER," filed May 24, 1972 in the name of Gerald J. Kosarko. The cartridge is adapted to be received in a cartridge compartment or chamber 12 provided in a suitable sound camera, a portion of which is shown generally at 14. The cartridge chamber 12 is defined by an inner wall 13, side walls 15 and 16, an upper wall 17, a bottom wall 18 and a door 21 which closes the compartment in a light-tight manner. As shown in FIG. 3, the camera is provided with a suitable film advancing member, such as a claw 7, which projects through wall 16 and is driven by a motor $M_1$ through known members (not shown) in a generally rectilinear path for intermittently advancing film F past an exposure aperture 9 in the camera. Wall 16 preferably is recessed as shown in FIG. 1, and the depth of chamber 12 preferably is substantially equal to or slightly greater than the thickness of the cartridge 10. This relationship reduces the possibility that the user will attempt to improperly insert the cartridge into the camera.

In the lower wall 18 of the cartridge compartment 12, an opening 19 is provided to admit certain portions of camera apparatus used for effecting sound recording on the film in the cartridge as it is being exposed to scene light in the camera. This apparatus can include a capstan 20 (FIG'S. 2 and 3) having a wide groove 20a which receives the film and raised outer circumferential surfaces 20b and 20c. As will be explained in greater detail, a movable pressure roller 22 is urged against these outer surfaces 20b and 20c of the capstan so that rotation of the capstan in a clockwise direction by a motor $M^2$ (FIG. 2) effects rotation of the roller. The width and depth of groove 20a preferably permits the film to be fully received within the groove. The film F engages a segment of the surface of roller 22 so that when the roller is rotated by the capstan the film is advanced by the roller from the exposure aperture 17 past a sound head or transducer 23 (shown in phantom in FIG. 3) which is positioned between the capstan and the exposure aperture. It has been found to be advantageous to have roller 22 engage capstan 20 at an angle which is offset to the plane of the film such that the film is caused to wrap around the surface of roller 22 slightly to impart a more positive drive to the film. The angle of offset which has been found to best serve this purpose is an angle of approximately 30° as is shown in FIG. 3.

A movable pressure member 25 urges the film sound track against the sound head 23, and a pair of spaced movable film guides 27 at opposite sides of the sound head guide the film between the sound head and member 25. A movable loop sensor 29 can engage the loop of film between the exposure aperture and the sound head, thereby sensing the length of film therebetween. Normally, there should be eighteen frames separation between the exposure aperture and the sound head. The loop sensor 29 can be connected to suitable means such as a variable resistance 98 (FIG. 4) to control the rate of operation of the film claw so that the desired separation is maintained within acceptable limits.

The camera sound apparatus comprising pressure member 25, film guides 27 and sensor 29 are movable by means (not shown) between the positions shown in FIG. 1 wherein they are retracted beneath wall 18 of the cartridge chamber to facilitate loading and unloading of a cartridge into the camera and an engaged position (shown in FIG. 3) wherein they are located for recording of sound onto the film. As will be explained later in detail, pressure roller 22 is also movable between its FIG. 1 retracted position and an operative position whenever door 21 is closed and the trigger mechanism of the camera is actuated. The movable sound apparatus of the camera is received into a sound cartridge of the type shown in FIG. 1 through an aperture 24 in one side 26 of the cartridge, the other side 28 and the ends 30 and 32 of the cartridge extending below aperture 24 and being substantially closed so that other parts of the cartridge are light-tight.

As shown in FIG. 1, end wall 32 of the cartridge has an exposure aperture 34 therein through which the film F can be exposed to scene light. A notch 31 in wall 32 cooperates with a pin 31a on wall 16 of the cartridge chamber for locating a cartridge in a camera. The portion of the cartridge above wall 35 that defines the top of aperture 24 preferably is substantially the same as the film cartridge disclosed in commonly-assigned U.S. Pat. No. 3,208,685 issued to E. A. Edwards et al on Sept. 28, 1965, and entitled, "ANTI-FRICTION DISC FOR STRIP MATERIAL CARTRIDGE" and in commonly-assigned U.S. Pat. No. 3,208,686 issued to E. A. Edwards et al on Sept. 28, 1965, entitled, "FILM CARTRIDGE," the disclosure of such patents being incorporated herein by reference.

A shroud 42 projects into cartridge compartment 12 from wall 13 of the camera and is positioned in the chamber such that it may be received in the sound aperture 24 of a sound cartridge between the film F and wall 35, and such that a conventional (i.e., silent) super 8 film cartridge as disclosed in U.S. Pat. No. 3,208,686 can be inserted into the cartridge chamber 12 and positioned between the shroud and wall 17. As disclosed in commonly assigned copending U.S. Pat. application Ser. No. 291,135, entitled, SHROUD FOR SOUND MOTION PICTURE CAMERA, filed in the name of Kosarko on 9/21/72, now U.S. Pat. No. 3,806,243, shroud 42 is effective to protect capstan 20 and sound head 23 (FIG. 3) and to align a received film relative to those members.

Figure 2:
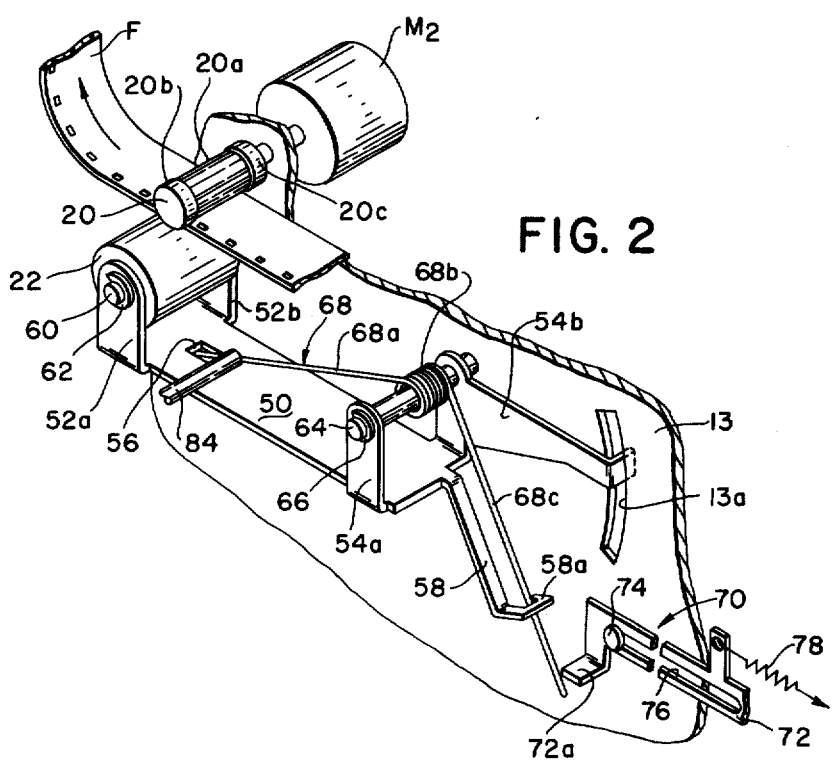
FIG. 2 is a fragmentary perspective view showing an embodiment of the present invention in a motion picture camera of the type shown in FIG. 1 with certain portions of the camera and the cartridge broken away or omitted to better illustrate the invention.

Referring now in detail to FIGS. 2 and 3, parts of the camera mechanism are broken away to more clearly illustrate a preferred embodiment of the present invention which includes a bracket 50 that carries the pressure roller 22, the bracket being mounted for pivotal movement between a retracted position wherein roller 22 is a spaced distance from the capstan and an engaged position wherein the roller is in contact with the capstan. Movement of the bracket 50 between these positions permits pressure to be exerted or relieved between the roller 22 and capstan 20 and also permits the film to be readily received or removed from a position therebetween.

To better understand the mechanism and the operation of the present invention the discussion will now be directed to the details shown in FIG. 2 wherein pressure roller 22 is shown rotatably secured to one end of a bracket 50 by a shaft 60 passing between spaced tabs 52a and 52b which are bent substantially at right angles to the body of the bracket. The ends of shaft 60 are secured in position by any known means, such as a horseshoe clip 62 which fits in a groove (not shown) near the end of shaft 60. Supported in this manner, roller 22 is movable between the positions previously discussed in a manner which will now be described in greater detail.

Bracket 50 pivots freely about a shaft 64 which is secured to wall 13 of the camera at a point below opening 19. Shaft 64 passes through openings in spaced tabs 54a and 54b which are also bent at right angles to the body of bracket 50 in the same direction as tabs 52a and 52b. Bracket 50 is secured to the shaft 64 by any suitable means such as a horseshoe clip 66 placed into a groove (not shown) near the end of shaft 64.

As best shown in FIG. 2, a torsion spring 68 is mounted with a coil portion 68a of the spring surrounding shaft 64 between tabs 54a and 54b of bracket 50. A first leg portion 68a of spring 68 passes through an opening 56 in bracket 50 to secure the spring to the bracket. Leg portion 68a could also be secured to bracket 50 by other known mechanical fastening means such as a screw, rivet, or solder. A second leg portion 68c of spring 68 is restrained under a tension force in the central portion of a "U-shaped" end 58a of a tab 58 which is at one end of the bracket 50. As shown in FIGS. 2 and 3, tab 58 is bent away from the bracket in a direction opposed to that of tabs 52a, 52b, 54a and 54b, and then is bent at a right angle to form a spring receiving notch in the end portion 58a. As previously mentioned, spring 68 is tensioned when assembled in this position and thereby maintains leg 68c in the opening defined by end 58a of tab 58. Because both ends of the spring engage spaced portions of bracket 50, the spring does not exert a force tending to move the bracket until leg 68c is flexed as described later.

FIGS. 2 and 3 illustrate a trigger assembly, generally designated 70, which can be of any known construction, such as that disclosed in commonly-assigned U.S. Pat. No. 3,511,948 entitled, "TRIGGER MECHANISM FOR MOTION PICTURE CAMERAS OR THE LIKE," issued in the name of E. S. Marvin on May 12, 1970. The assembly comprises a slide member 72 which is slidably secured to wall 13 of the camera by a rivet that passes through an elongated slot or opening 76 in slide 72 and is attached to wall 13. The slide member has an end 72a which is bent off at approximately a right angle bend from the body of slide 72 and is located in the same plane as spring leg portion 68c. When the camera is not being operated, slide 72 is urged to the right (FIG. 2) by a spring 78 to bring rivet 74 into contact with the left end of opening 76. When in this position, bracket 50 is free to pivot about shaft 64 until leg portion 68c contacts end 72a. Thus, in the preferred embodiment illustrated, bracket 50 can freely pivot between a position wherein roller 22 contacts capstan 20 at an approximately 30° offset and a position wherein roller 22 is spaced from the capstan and spring leg portion 68c contacts end 72a of slide 72. If it is desired to displace roller 22 and hold it spaced from the capstan whenever the trigger assembly 70 is not actuated, a spring member or other resilient means (not shown) can be provided to urge bracket 50 in a counterclockwise direction about shaft 64, thereby positively effecting such actuation.

An end portion 80 of slide 72 (or a separate member coupled to the slide) is engageable through an opening in a wall 81 at the exterior of the camera. Portion 80 is depressed (moved to the left) against the force of spring 78 by the camera operator to initiate operation of the camera.

To prepare a camera for recording sound and images upon film, the roller 22, film guides 27 and loop sensor 29 are retracted and a sound cartridge 10 is positioned in the cartridge chamber of the camera with the portion of the film extending across aperture 24 received between the capstan and roller as shown in FIG. 3. Then the roller 22, film guides 27 and loop sensor 29 are returned to their FIG. 3 position. When trigger 80 is moved to the left by the operator (as indicated by arrow 82), slide 72 also is moved to the left. During the initial movement of the trigger to the left, there may be some lost motion of the trigger before leg 68c of spring 68 is contacted by tab 72a. However, continued movement of trigger 80 is effective to drive tab 72a into contact with leg 68c and then it causes leg 68c to be pivoted in a counterclockwise direction about shaft 64. As leg 68c of the spring is moved by slide 72, bracket 50 also is caused to rotate in a counterclockwise direction about shaft 64 by spring leg 68a. Continued movement of bracket 50 causes pressure roller 22 to be brought into resilient contact with the film F and the outer surfaces 20b of capstan 20. When the force of capstan 20 resisting the movement of pressure roller 22 is greater than the force applied by spring 68, then further movement of bracket 50 is prevented and any continued movement of leg 68c will only result in deflection of the leg and energy being stored in the spring.

After trigger 80 has been actuated and pressure roller 22 has been moved into resilient contact with capstan 20 as shown in FIG. 3, a control circuit is actuated for causing recording of images and sound onto the film F. In the preferred embodiment shown in FIG. 4, the control circuit 88 is actuated by an extension of tab 54 which passes through an opening 13a in wall 13, and cooperates with a switch 90 of the circuit 88 as will be described. Of course, it is also possible to actuate the control circuit 88 directly by lever 72 such as described in the aforementioned U.S. Pat. No. 3,511,948.

Figure 4:
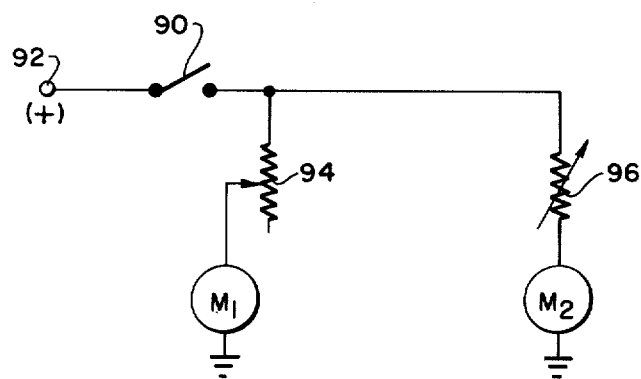
FIG. 4 is a diagramatic illustration of the electrical circuit for controlling the operation of a sound motion picture camera of the type shown in FIG. 1.

Referring now in greater detail to the control circuit 88 shown in FIG. 4, a source of positve potential is depicted by a terminal 92 which is connected through a normally open switch 90 to parallel first and second branches which return to ground. In the preferred embodiment, the first branch includes in series a variable resistor or potentiometer 94 and motor M1 and the second branch includes in series variable resistor 96 and a motor M2. The speed of each of the motors M1 and M2 is adjustable by varying the resistance of resistors 94 and 96, respectively, to synchronously drive film claw 7 and capstan 20. In the preferred embodiment, resistor 96 is preset to maintain motor M2 at a preselected constant speed and resistor 94 is varied by loop sensor 29 as will be discussed hereafter.

When switch 90 is closed by the movement of the extension of tab 54, the application of electrical potential actuates the motors M1 and M2. Motor M1 then drives film F intermittently past the exposure aperture 9 through pull-down claw 7 and motor M2 continuously drives the film F from the aperture along a film path extending over loop sensor 29 and one guide 27, by the sound head 23 and pressure member 25, past the other guide 27, and then between the roller 22 and capstan 20. After the film leaves the roller, it passes through a light-tight opening in the cartridge, around a heart-shaped film snubber 37, and then onto the roll of film wound around the film take-up core 36. The film path varies somewhat in operation due to the intermittent movement of film at the exposure aperture effected by film claw 16 and the continuous movement of the film effected by the capstan drive 20. As noted earlier, the size of this loop can be sensed by sensor 29 and the speed of the film claw regulated by the potentiometer 94 controlling the speed of motor M1 such that the loop is maintained within a given range of acceptable sizes which permit the capstan to operate continuously, thereby assuring continuous recording of sound on film.

Once the film in the sound cartridge has been exposed, the camera door 21 can be opened to permit removal of the cartridge from the cartridge chamber 12. As shown in phantom in FIG. 3, bracket 50 can be displaced in a counterclockwise direction about shaft 64 causing pressure roller 22 to be moved a spaced distance from capstan 20 whereby the film F may be removed from therebetween. In the preferred embodiment bracket 50 is moved by a mechanism (not shown) secured to a shaft 84 and coupled to a door-release drive so that the shaft is displaced to a position identified in 84a in FIG. 3 when the door 21 of the camera is opened.

Although the bracket 50 as described above is movable in response to slide 72 contacting spring 68, it will be understood by those in the art that the bracket itself could be of a resilient material such that slide 72 could contact arm 58 or another protrusion of the arm to cause the bracket to be displaced.

The invention has been described in considerable detail with particular reference to a preferred embodiment thereof, but it will be understood that variations and modifications can be effected within the spirit and scope of the invention.

I claim:

1. For a motion picture camera having a film path leading past a sound recording head for recording of sound onto a received film strip, a film advancing mechanism for driving said film past said sound recording head, said film advancing mechanism comprising:
   a. a capstan adapted to be operatively driven at substantially a uniform speed, said capstan being positioned along said film path;
   b. a pressure roller adapted to be moved between (1) a first position wherein the pressure roller is a spaced distance from said capstan such that a received film strip may be freely positioned and removed from between said pressure roller and said capstan and (2) a second position wherein the pressure roller is in resilient contact with said capstan and a received film strip for driving the film strip therebetween;
   c. a mounting bracket for supporting said pressure roller, said bracket being movably secured to the motion picture camera relative to said film path for permitting said pressure roller to be moved between said first and second positions;
   d. a trigger mechanism mounted for movement between (1) a first position wherein said mechanism is ineffective to cause said capstan to be driven, and (2) a second position wherein said mechanism is effective to cause said capstan to be driven at substantially a uniform speed; and
   e. spring means connected to said mounting bracket and engageable by said trigger mechanism as said mechanism moves from its first position to its second position to urge said bracket in a direction to move said pressure roller to its second position, said trigger mechanism being disengaged from said spring means as said mechanism moves from its second position to its first position, thereby relieving the force exerted on said capstan by said pressure roller.

2. Means for controlling the engagement and disengagement between a movable pressure roller and a capstan rotatable about a fixed axis, the mechanism comprising:
   a bracket rotatably supporting the roller for movement between a retracted position wherein the roller is spaced from the capstan and an engaged position wherein the roller is in pressure engagement with the capstan;
   means for moving the bracket from its retracted position to its engaged position and for urging the roller against the capstan comprising a trigger member movable between an engaged position wherein said capstan is rotatably driven and a disengaged position wherein said capstan is not driven, and resilient means having a portion located to be engaged by the trigger member in response to movement of the trigger member to its engaged position for concurrently exerting a force on the bracket in a direction to urge the bracket toward its engaged position.

3. Controlling means as set forth in claim 2 wherein said resilient means comprises a torsion spring having a coil portion and first and second leg portions, connected to said bracket, and the second leg portion being located to be engaged by the trigger member as the trigger member moves from its disengaged to its engaged position.

4. Controlling means as set forth in claim 3 wherein the bracket comprises retaining means for holding the second leg portion of the spring in a tensioned condition, and the trigger member is effective when moved to its engaged position to release the second leg portion of the spring from the retaining means, thereby exerting a resilient force on the bracket tending to move the bracket to its engaged position.

5. Controlling means as set forth in claim 4 wherein the trigger member is spaced from the second leg portion of the spring when the trigger member is in its disengaged position.

6. In a sound motion picture camera adapted to receive a film strip, means defining a film path along which the film strip is movable past an exposure aperture for the recording of images upon the film strip and past sound recording apparatus of the camera for recording of sound onto the film strip, the camera having a first drive means operable for moving the film strip along the film path past the exposure aperture, a second drive means operable for moving the film strip along the film path past the sound recording apparatus, and a trigger mechanism movable between (1) a first position for energizing said first and second drive means and (2) a second position for de-energizing said first and second drive means, said second drive means comprising:
  a. a capstan;
  b. means actuated by the trigger mechanism for driving said capstan at substantially a uniform speed;
  c. a pressure roller;
  d. means supporting said pressure roller for movement between (1) a first position wherein said roller is spaced from said capstan to relieve pressure on the film strip between the capstan and pressure roller and (2) a second position wherein said roller contacts said capstan for driving a received film strip therebetween; and
  e. control means for moving said supporting means from said first position to said second position and for maintaining said supporting means in said second position in response to actuation of said trigger mechanism to operate the first and second drive means, said control means comprising a spring having first and second leg members engageable with said means supporting said pressure roller, said second leg of said spring being positioned to be engaged by said trigger mechanism when said trigger mechanism is moved from its first position to its second position.

7. In a motion picture camera having a capstan adapted to drive a received film strip responsive to actuation of a trigger mechanism, the improvement comprising:
  a. a roller;
  b. a bracket supporting said roller for movement between (1) a first position wherein said roller is spaced from the capstan; and (2) a second position wherein said roller is adjacent to said capstan; and
  c. a spring engageable by the trigger mechanism when the trigger mechanism actuates the capstan, the trigger mechanism being effective to apply a force through said spring to urge said roller from its first position toward its second position and for resiliently maintaining said roller in its second position as a function of force applied through said spring by the trigger mechanism.

8. The improvement as set forth in claim 7 wherein said bracket normally restrains said spring in a compressed condition such that a predetermined force is stored in said spring and wherein said trigger mechanism transmits a force through said spring to said roller which is at least equal to the force stored in said spring.

9. An improvement for a motion picture camera having a capstan and a pressure member adapted to resiliently move a received film strip into a cooperating position with said capstan for driving said film strip when said capstan is energized, said improvement comprising:
  a. a bracket member supporting said pressure member for movement between (1) a first position wherein said pressure roller is spaced from said capstan, and (2) a second position wherein said pressure member moves said film strip into the cooperating position with said capstan;
  b. a spring supported by said bracket in a compressed condition such that a force is stored therein; and
  c. actuation means for energizing said capstan, said actuation means being engageable with said spring and being effective to transmit to said bracket through said spring a force equal to or greater than the force stored in said spring for urging said pressure member toward its second position and for maintaining said pressure member in its second position as long as said actuation means energizes said capstan.

10. A mechanism for controlling the engagement and disengagement of a movable pressure roller with a capstan, the mechanism comprising:
  a. a bracket rotatably supporting the roller for movement between a retracted position wherein the roller is spaced from the capstan and an engaged position wherein the roller is in pressure engagement with the capstan;
  b. means for moving said bracket from its retracted position to its engaged position and for maintaining the roller in pressure engagement with said capstan, said means comprising:
   i. a trigger member movable from a first position wherein said capstan is actuated and a second position wherein said capstan is non-actuated; and
   ii. resilient means engageable by said trigger member as said trigger member is moved from its second position it its first position, said trigger member cooperating with said resilient means to move the roller from its retracted position toward its engaged position and to resiliently maintain said bracket in its engaged position when said trigger member is maintained in its first position.

11. For a motion picture camera having trigger means actuable for energizing drive means of the camera, the improvement comprising:
  a. a capstan supported by said camera, said capstan adapted to be rotatably driven by the drive means when the drive means is actuated;
  b. a pressure roller;
  c. a bracket rotatably supporting said pressure roller, said bracket being movable between (1) an engaged position wherein said pressure roller is positioned adjacent to said capstan and (2) a retracted position wherein said pressure roller is spaced apart from said capstan; and
  d. a spring interposed between the trigger means and said bracket, said spring being adapted to transmit a force from the trigger means to said bracket as the trigger means is actuated to move said bracket from said retracted position toward said engaged position and to maintain said bracket in said engaged position.

* * * * *